(12) United States Patent
Guo

(10) Patent No.: US 10,082,072 B2
(45) Date of Patent: *Sep. 25, 2018

(54) HIGH PRESSURE ENERGY STORAGE THERMAL ENERGY POWER MACHINE AND WORK-DOING METHOD THEREFOR

(71) Applicant: Yuanjun Guo, Yongzhou (CN)

(72) Inventor: Yuanjun Guo, Yongzhou (CN)

( * ) Notice: Subject to any disclaimer, the term of this patent is extended or adjusted under 35 U.S.C. 154(b) by 23 days.

This patent is subject to a terminal disclaimer.

(21) Appl. No.: 15/323,743

(22) PCT Filed: Dec. 5, 2014

(86) PCT No.: PCT/CN2014/093131
§ 371 (c)(1),
(2) Date: Jan. 4, 2017

(87) PCT Pub. No.: WO2016/000402
PCT Pub. Date: Jan. 7, 2016

(65) Prior Publication Data
US 2017/0167365 A1      Jun. 15, 2017

(30) Foreign Application Priority Data

Jul. 4, 2014   (CN) .......................... 2014 1 03140511

(51) Int. Cl.
*F02B 41/04*      (2006.01)
*F02B 41/00*      (2006.01)
(Continued)

(52) U.S. Cl.
CPC .............. *F02B 41/04* (2013.01); *F02B 19/02* (2013.01); *F02B 41/00* (2013.01); *F02B 47/02* (2013.01); *F02B 47/04* (2013.01); *F02B 75/021* (2013.01)

(58) Field of Classification Search
CPC .......... F02B 41/04; F02B 41/00; F02B 19/02; F02B 47/02; F02B 47/04; F02B 75/021
(Continued)

(56) References Cited

U.S. PATENT DOCUMENTS 2,671,311 A * 3/1954 Rohrbach ................. F01P 3/00
                                                         123/25 C
3,842,808 A * 10/1974 Cataldo .................. F02B 47/02
                                                         123/143 R
(Continued)

FOREIGN PATENT DOCUMENTS

CN           101403350 A       4/2009
CN           101532420 A       9/2009
(Continued)

*Primary Examiner* — Mahmoud Gimie
(74) *Attorney, Agent, or Firm* — Gokalp Bayramoglu

(57) ABSTRACT

Disclosed is a high-pressure energy storage thermal energy power machine. A gasifier is arranged on an exhaust duct on a cylinder head of an internal combustion engine. The gasifier is provided with gasifying plates in the direction of parallel air flow. Gas holes are arranged on the gasifying plates. The bottom portion of the gasifier is provided with a working medium inlet. Gasifying plates are distributed with gaps. Gas holes are distributed in an array on the gasifying plates. An energy storage chamber is arranged on the cylinder head. The gasifier is connected to the energy storage chamber. The energy storage chamber is connected to a high-pressure valve. The high-pressure valve is arranged on the cylinder head and above the cylinder block. The ratio of the volume of the energy storage chamber to the volume of the cylinder of the internal combustion engine is 1:1-3.

15 Claims, 3 Drawing Sheets

(51) Int. Cl.
*F02B 19/02* (2006.01)
*F02B 47/04* (2006.01)
*F02B 47/02* (2006.01)
*F02B 75/02* (2006.01)

(58) Field of Classification Search
USPC .............................................. 123/258, 25 C
See application file for complete search history.

(56) References Cited

U.S. PATENT DOCUMENTS

| | | | |
|---|---|---|---|
| 4,040,400 A | | 8/1977 | Kiener |
| 4,552,106 A | * | 11/1985 | Spence ................... F02B 41/04 |
| | | | 123/198 A |
| 9,885,324 B2 | * | 2/2018 | Guo ....................... F02M 31/18 |

FOREIGN PATENT DOCUMENTS

| | | |
|---|---|---|
| CN | 104100365 A | 10/2014 |
| CN | 204082319 U | 1/2015 |
| GB | 2492827 A | 1/2013 |
| JP | H0861103 | 3/1996 |

\* cited by examiner

US 10,082,072 B2

HIGH PRESSURE ENERGY STORAGE THERMAL ENERGY POWER MACHINE AND WORK-DOING METHOD THEREFOR

TECHNICAL FIELD

The present invention relates to the field of thermal energy storage power apparatus, particularly to the thermal energy power apparatus which store the thermal energy of high-pressure gas generated by work of internal combustion engine.

BACKGROUND

Each working cycle of a four-stroke engine is composed of an intake stroke, a compression stroke, a working stroke, and an exhaust stroke. For a four-stroke engine, in order to complete a working cycle, the piston in the cylinder needs to travel four times back and forth (i.e., the crankshaft turns twice). The four-stroke engine is further divided into four stroke gasoline engine and four stroke diesel engine. The main difference between these two kinds of the four-stroke engines is the ignition mode. The gasoline engine uses a spark plug ignition, while the diesel engine uses a compression ignition.

The four-stroke engine belongs to the reciprocating piston internal combustion engine, which can be divided into three types—a gasoline engine, a diesel engine, and a gaseous fuel engine according to different types of fuel being used. The reciprocating piston internal combustion engine which uses gasoline or diesel as fuel is called the gasoline engine and the diesel engine respectively. The reciprocating piston internal combustion engines that use natural gas, liquefied petroleum gas and other gaseous fuel are called the gaseous fuel engine. Gasoline and diesel are both petroleum products, and are traditional fuels for the automobile engine.

Non-petroleum fuel is called substitute fuel. The engine which uses the substitute fuel is called substitute fuel engine, such as ethanol engine, hydrogen engine, methanol engine, etc.

In view of the heat balance of the current automobile engine, the power for power outputting generally accounts for only 30%-45% (diesel engine) or 20%-30% (gasoline engine) of the total heat of fuel combustion. The power which is discharged as residual heat out of the automobile accounts for 55%-70% (diesel engine) or 70%-80% (gasoline engine), mainly including the heat taken away by recirculating cooling water and the heat taken away by exhaust gas. The following table is heat balance table of internal combustion engine.

| items of thermal balance % | gasoline engine | high-speed diesel engine | middle-speed diesel engine |
| --- | --- | --- | --- |
| heat of heat balance of effective work | 20-30 | 30-40 | 35-45 |
| heat taken away by coolant | 25-30 | 20-25 | 10-20 |
| heat taken away by exhaust gas | 40-45 | 35-40 | 30-40 |
| other heat loss | 5-10 | 5-10 | 10-15 |

The gasoline engine makes good mixture gas by mixing air with gasoline at a certain ratio. The mixture gas is inhaled into a cylinder during the intake stroke. Then the mixture gas is compressed and ignited to burn to generate heat energy. The gas with high temperature and high-pressure is working on the top of the piston to push the piston to perform reciprocating linear motion, outputting mechanical energy to outside world through a connecting rod, a crankshaft, and a flywheel. The four-stroke gasoline engine accomplishes an intake stroke, a compression stroke, a working stroke, and an exhaust stroke within a working cycle.

Intake stroke: the piston is driven by the crankshaft to move from the top dead center (TDC) to the bottom dead center (BDC). An intake valve opens at the moment, an exhaust valve is closed, and a crankshaft rotates 180°. During the moving of the piston, the volume of the cylinder is gradually increased. The pressure of the gas in the cylinder is gradually decreased from pr to pa to form a certain vacuum degree. Mixture gas of air and gasoline is inhaled into the cylinder through the intake valve, and is further mixed in the cylinder to form a combustible mixture gas. Since the intake system has resistance, at the intake end point (point A in the figure), the pressure of the gas in the cylinder is less than atmospheric pressure 0p, that is, pa=(0.80-0.90) 0p. The temperature of the combustible mixture gas entered the cylinder is increased to 340-400K, because the combustible mixture gas is heated by the intake pipe, the cylinder wall, the piston head, valves, the combustion chamber wall and other high temperature parts, and is mixed with the residual exhaust gas.

Compression stroke: in the compression stroke, the intake valve and the exhaust valve are both closed. The piston moves from the BDC to the TDC, and the crankshaft rotates 180°. When the piston is moving upward, the working volume is reduced gradually. The pressure and the temperature of the mixture gas in the cylinder is constantly increased after the compression. When the compression end point is reached, the pressure pc of the mixture gas can reach 800-2000 kPa, and the temperature of the mixture gas reach 600-750K.

Working stroke: when the piston approaches TDC, the combustible mixture gas is ignited by the spark plug. The combustible mixture gas burns and releases a lot of heat, causing the pressure and temperature of the gas in cylinder to increase rapidly. The maximum combustion pressure pZ reaches 3000-6000 kPa, and the temperature TZ reaches 2200-2800K. The gas with high temperature and high-pressure pushes the piston to move from the TDC to the BDC, and outputs the mechanical energy to outside world through a mechanism of crank and connecting rod. With the piston moving downward, the volume of the cylinder is increased, and the pressure and temperature of the gas is reduced gradually. When b point is reached, the pressure of the gas is reduced to 300-500 kPa, and the temperature is reduced to 1200-1500K. In the working stroke, the intake valve and the exhaust valve are both closed, and the crankshaft rotates 180°.

Exhaust stroke: in the exhaust stroke, the exhaust valve is open, and the intake valve is still closed. The piston moves from the BDC to the TDC, and the crankshaft rotates 180°. When the exhaust valve is open, on one hand, the burned exhaust gas is discharged out of the cylinder under the effect of the cylinder pressure difference between inside and outside. On the other hand, the burned exhaust gas is discharged out of the cylinder by the pushing-out effect of the piston. Due to the resistant effect of the exhaust system, the pressure at the exhaust end point r point is slightly more than the atmospheric pressure, that is, pr=(1.05-1.20) p0. The temperature of the exhaust end point is Tr=900-1100K. When the piston comes to the TDC, a certain volume of exhaust gas is left and cannot be discharged. This part of the exhaust gas is called residual exhaust gas.

The four-stroke diesel engine is similar to the gasoline engine. Each working cycle is also composed of an intake stroke, a compression stroke, a working stroke, and an exhaust stroke. Since the diesel engine uses diesel as fuel, compared with the gasoline, the diesel has a low self-ignition temperature, large viscosity, and is hard to volatilize. The diesel engine uses compression end point self-ignition. The working process and system structure of the diesel engine is different from those of the gasoline engine. Intake stroke: the working medium which enters the cylinder is pure air. Since the resistance of the intake system of the diesel engine is small, the pressure of the intake end point is pa=(0.85-0.95) p0, which is higher than that of the gasoline engine. The temperature of the intake end point is Ta=300-340K, which is lower than that of the gasoline engine.

Compression stroke: since the compressed working medium is pure air, the compression ratio of the diesel engine is higher than that of the gasoline engine (generally, ε=16-22). The pressure of the compression end point is 3000-5000 kPa. The temperature of the compression end point is 750-1000K, which is greatly more than the self-ignition temperature of the diesel (about 520 K).

Working stroke: when the compression stroke is approaching the end, under the effect of the high-pressure oil pump, the diesel is injected with a high-pressure of about 10 Mpa to the combustion chamber of the cylinder. Upon mixed with the air in a short time, the diesel self-ignites and burns immediately. In the cylinder, the pressure of the gas increases rapidly, reaching up to 5000-9000 kPa. The highest temperature is 1800-2000K. Since the diesel engine self-ignites and burns under compression, the diesel engine is called compression ignition engine.

Exhaust stroke: the exhaust of the diesel engine is basically the same as that of the gasoline engine, only that the exhaust temperature is lower than that of the gasoline engine, generally, Tr=700-900K. As for single-cylinder engine, the rotational speed is inhomogeneous, the working of the engine is unstable, and the vibration is severe. That is because only one stroke of the four strokes is working, while the other three strokes are the strokes that consume power to prepare for working. To solve this problem, the flywheel must have sufficient rotational inertia, which will lead to increasing of the weight and size of the whole engine. Using a multi-cylinder engine can offset the above deficiency. Modern automobiles usually use the four-cylinder engine, the six-cylinder engine, and the eight-cylinder engine.

After the cylinder in the above internal combustion engine works, the temperature in the cylinder reaches above 1000K. The high temperature gas is discharged through the exhaust valve, leading to the waste of the heat energy directly. The temperatures of parts like the inner wall of the cylinder, the piston head, the cylinder head, the valves, etc. are high, which will affect the efficiency of compression stroke. Thus, the cooling system is provided on all the cylinders of the existing engine.

Regarding the utilization of the exhaust gas of the engine, current engines may have a turbo booster. After boosting, the pressure and temperature of the engine are significantly increased during the working. Therefore, the lifetime of the engine will be shorter than that of the engine which has the identical emission without boosting. Furthermore, the mechanical performance and the lubrication performance are both affected. Thus, the application of the turbo boost technology in the engine is limited in a certain degree.

The utilization of the waste heat of the exhaust gas is low. An energy recovery device should resist to the vibration and the shock. The waste heat recovery device of the exhaust gas cannot affect the normal working performance of the engine. Currently, methods of using the exhaust gas waste heat of the engine mainly are the following types. An exhaust turbocharge uses a part of the energy of the exhaust gas to improve the intake pressure of the internal combustion engine to increase the volume of gas, to improve the power property and economy of the engine. Currently, quite a few automobiles use the method of the turbo boost. However, the method of the turbo boost can only employ a part of the energy of the exhaust gas. Furthermore, there are problems, for example, the whole working condition of the engine being hard to match, and some other problems.

There are three methods of using of the exhaust gas of the engine to generate power, i.e., the thermoelectric power generation, the exhaust gas turbine power generation, and the Teflon turbine power generation. The thermoelectric power generation mainly uses thermoelectric power generation material to generate power. However, since the energy conversion rate of thermoelectric material is low, it is required that the thermoelectric conversion material with a high energy conversion rate should be developed. The exhaust gas turbine power generation uses the exhaust gas to drive the turbine to make the generator generate power. This method of power generation has certain influences on the performance of the engine, which needs further study.

Currently, methods of using the waste heat of the exhaust gas of the engine to refrigerate mainly are absorption refrigeration and sorption refrigeration. The principle of the absorption refrigeration is that the heat is used as power to accomplish the refrigeration cycle. The sorption refrigeration uses properties of some solid materials, which can adsorb a certain gas or steam at a certain temperature and pressure, and can release the gas or steam at another temperature and pressure, to realize refrigeration. According to the present situation of the utilization of the waste heat of the exhaust gas of the engine at home and abroad, a concept of the method of using the waste heat of the exhaust gas of the engine to generate heat and power is provided The basic structure of the single-cylinder engine includes a cylinder, a piston, a connecting rod, a crankshaft, a cylinder head, a block, a camshaft, an intake valve, an exhaust valve, a valve spring, and a crankshaft toothed pulley, etc. The working chamber of the reciprocating piston engine is called a cylinder. The internal surface of the cylinder is cylindrical. The piston that performs reciprocating movement in the cylinder is hinged with one end of the connecting rod through a piston pin. The other end of the connecting rod is connected to the crankshaft to form the crank and connecting rod mechanism. When the piston performs reciprocating movement in the cylinder, the crankshaft is pushed to rotate by the connecting rod, or vice versa. At the same time, the volume of the cylinder is continuously changed from small to large, and then from large to small. The cycle is repeated continuously. The top of the cylinder is sealed with the cylinder head. The intake valve and the exhaust valve are mounted on the cylinder head. Through the opening and closing of the intake valve and the exhaust valve, the inflating of the gas into the cylinder and the discharging of the exhaust gas from the cylinder can be achieved. The opening and closing of the intake valve and the exhaust valve are driven by the camshaft. The camshaft is driven by the crankshaft through a toothed belt or a gear. The part which forms the cylinder is called the cylinder block. The crankshaft rotates in the crankcase.

Since the working medium does not burn, the external combustion engine avoids the knocking problem of working of the traditional internal combustion engine. Thus, the external combustion engine achieves a high efficiency, a low noise, a low pollution, and a low running cost. Once the heat chamber reaches 700° C., the apparatus can work and run immediately. The lower the environmental temperature is, the higher the efficiency of power generation is. The most remarkable advantage of the external combustion engine is the output and efficiency are not limited by the altitude, which is suitable to be used in high altitude areas.

At the same time, the main existing problems and defects of the Stirling Engine are as follows. The manufacture cost is high. The sealing technology of working medium is difficult. The reliability and service life of the seal components have problems. The cost of the material is high. The power adjusting and controlling system is complicated. The machine is relatively bulky. The costs of the expansion chamber, the compression chamber, the heater, the cooling chamber, the regenerator, etc. are high. The heat loss is 2-3 times that of the internal combustion engine, etc.

Organic Rankine Cycle system includes a pump, an evaporator, an expander, a generator, a condenser, etc. The heat collector absorbs the solar irradiance, and the temperature of heat exchange medium in the heat collector is increased. The heat exchange medium transfers the heat to the organic medium through the evaporator. The organic medium is heated in the evaporator under a constant pressure. The gaseous organic medium with high-pressure enters the expender to work to drive the generator to generate power. The organic medium which is discharged from the end of the expender enters the condenser to condense under a constant pressure. The organic medium from the outlet of the condenser enters the evaporator after being compressed by the pump to accomplish a generation cycle.

Organic Rankine Cycle system has problems of low conversion efficiency, large volume, and requiring an expander which has a complex structure to work.

The existing engine especially, the multi-cylinder engine with a large emission, is noisy.

SUMMARY

The utilization of the exhaust gas in the prior art in the above section of Background takes place outside the cylinder, and needs to be provided with an entire cycling system. The utilization rate of the residual heat of the exhaust gas is low. The energy recovery devices should be vibration and shock resistant. The exhaust gas waste heat recovery devices cannot affect the normal working performance of the engine. Currently, methods related to exhaust gas waste heat utilization of the engine substantially include following types. The exhaust turbo booster uses a part of the energy of the exhaust gas to raise the intake pressure of internal combustion engine to increase the volume of gas, so as to improve the power property and economy of the engine. Nowadays, a large number of vehicle engines employ the method of turbocharging. However, the method of turbocharging can only employ a part of energy of exhaust gas. Furthermore, there are issues, for example, the total working condition of the engine is hard to match, and other problems. There are three main methods of using exhaust gas waste of the engine to generate power, i.e., thermoelectric power generation, exhaust gas turbine power generation, and Teflon turbine power generation. Thermoelectric power generation mainly uses thermoelectric power generation materials to generate power. However, since the energy conversion rate of thermoelectric material is low, there is a requirement of developing thermoelectric conversion materials with a high conversion rate. Exhaust gas turbine power generation uses the exhaust gas to drive the turbine to make the generator generate electricity. This type of power generation method has certain influence on the performance of the engine.

Nowadays, methods of refrigeration utilizing the waste heat of the exhaust gas of engine substantially include absorption refrigeration and sorption refrigeration. The principle of the absorption refrigeration is to accomplish refrigeration cycle by thermal energy power. The sorption refrigeration is to accomplish refrigeration by using certain solid substances which can absorb certain gas or steam under a certain temperature and pressure and release the gas or steam under another temperature and pressure. According to the present situation of utilizing the exhaust gas waste heat of engine, an idea of utilizing the exhaust gas waste heat of engine to generate heat and power is provided.

The present invention effectively utilizes the technic features that the cylinder of the internal combustion engine has high temperature and high pressure, and needs to dissipate the heat and exhaust. The structure of the internal combustion engine is fully used to utilize the thermal energy, so that the thermal energy generated by working can be reused to produce mechanical energy. The following issues are overcome, that is, costs of expansion chamber, compression chamber, heater, cooling chamber, and regenerator, etc. of the external combustion engine are high, and the heat loss of the external combustion engine is 2-3 times that of the internal combustion engine. The technical issues of organic Rankine circulatory system which requires an expander or a gas turbine and has high manufacturing cost. The problem of low thermal energy utilization rate of internal combustion engine is overcome.

The present invention provides a high-pressure energy storage thermal energy power machine which has high thermal energy conversion rate, recyclable working medium, the feature where the thermal energy generated by working inside the cylinder can be converted into mechanical energy, and environmentally friendly exhaust gas.

The technical solution of the present invention is as below. A high-pressure energy storage thermal energy power machine is provided wherein a gasifier is provided on the exhaust duct of the cylinder head of the internal combustion engine. The gasifier is provided with the gasifying plates in the direction parallel to gas flow. The gasifying plates are provided with the gas holes. The bottom of the gasifier is provided with a working medium inlet. The gasifying plates are distributed with gaps. The gas holes are distributed in an array on the gasifying plates. The energy storage chamber is arranged on the cylinder head. The gasifier is connected to the energy storage chamber. The energy storage chamber is connected to high-pressure valve which is positioned on the cylinder head and above the cylinder block. The ratio between the volume of the energy storage chamber and the volume of a cylinder of the internal combustion engine is 1:1-3. The pressure inside the energy storage chamber is the pressure that is generated by working of the working medium. The length of the gasifier: the width of the gasifier: the diameter of the exhaust duct=3:3:1. The external layer of the internal combustion engine is wrapped with thermal insulation layer.

Further, the gasifier is provided with at least one gasifying plate.

Further, the size of a gap of the gasifying plates distributed with gaps is 1.2-6 mm.

Further, the gas holes of an upper layer of gasifying plate and a lower layer of gasifying plate are positioned along the same axis.

Further, the gasifier is provided with three layers of gasifying plates which are distributed with gaps.

Further, the size of the gap of the three layers of gasifying plates which are distributed with gaps is 1.5-3.5 mm.

Further, the dimension of the gas holes is configured that the diameter of the gas hole on an upper layer of gasifying plate is one time larger than the diameter of the gas hole on a lower layer of gasifying plate.

Further, the diameter of the gas hole on the first layer of gasifying plate is one time larger than the diameter of the gas hole on the second layer of gasifying plate. The diameter of the gas hole on the second layer of gasifying plate is one time larger than the diameter of the gas hole on the third layer of gasifying plate.

Further, the diameter of the gas hole on the first layer of gasifying plate is 0.8-14 mm. The diameter of the gas hole on the second layer of gasifying plate is 0.4-7 mm. The diameter of the gas hole on the third layer of gasifying plate is 0.2-3.5 mm.

Further, the thickness of the gasifying plates is 0.2-6 mm.

Further, the cylinder of the internal combustion engine and the gasifying plates are made of thermally conductive metal material.

Further, the cylinder of the internal combustion engine is wrapped with a thermal insulation layer without cooling circulating devices.

The working method of the high-pressure energy storage thermal energy power machine is as below. A working stoke performed by a high-pressure injected gaseous working medium and an exhaust stroke are added, after the steps of working or exhausting of the existing engine. Wherein high-pressure injected gaseous working medium is formed by the gasifier and the energy storage chamber. The gas which have high temperature and high pressure passes through the gasifier arranged in the exhaust duct after the existing engine discharges exhaust. The pressure pump injects the working medium that works into the working medium inlet which is positioned at the bottom of the gasifier so that the working medium instantly flows into the energy storage chamber with the high-pressure gas generated by gasification. The high-pressure valve opens when the piston reaches the TDC thereby the high-pressure gas inside the energy storage chamber injects high-pressure gas working medium and pushes the piston to work again. After the piston works again, the high-pressure valve is closed and the working medium that works is exhausted through the exhaust duct. The discharged working medium that works flows into the liquid storage tank after cooling by the cooler. The residual exhaust gas is exhausted by the exhaust port which is positioned on the liquid storage tank.

The six-stroke working method of the above high-pressure energy storage thermal energy power machine is as below. Each working cycle of the six-stroke engine includes intake stroke, compression stroke, working stroke, exhaust stroke, air injection working stroke, and exhaust stroke. To accomplish a working cycle of the six-stroke engine, the piston needs to go back and forth for six strokes (i.e. The crankshaft turns three times.)

The internal combustion engine of the above high-pressure energy storage thermal energy power machine can be gasoline engine, diesel engine, or substitute fuel engine. The engine can be dual-stroke engine, four-stroke engine, six-stroke engine, or engines with other strokes, which is added by air injection working stroke.

The existing internal combustion engine works through fuel compressing and expanding. A large amount of thermal energy generated by combustion is discharged with exhaust gas, while the internal combustion engine of present invention discharges gas which passes through the gasifying plates positioned on the gasifier after works. The gasifying plates absorb 45%-99% of thermal energy of the exhaust gas and heat the working medium that works. After thermal energy of the exhaust gas is absorbed, the temperature of the exhaust gas is reduced. The internal combustion engine is wrapped with thermal insulation layer so that the temperature is constant. The thermal energy is effectively utilized and the first working stroke is increased in the situation that the working of the internal combustion engine is not affected.

The advantages of the present invention are as below. The increased working stroke reduces the temperature of the cylinder and has high compression ratio. The discharged exhaust gas is more environment-friendly than existing engine because of the filtration of cooler and liquid storage tank. Due to being filtered by a cooler and a liquid storage tank, discharged exhaust gas is more environmentally friendly than that in existing engines. Noise is reduced after the temperature of the cylinder block is lowered. The first working stroke is added, and the thermal energy utilization rate is increased by 20%-95%. Thermal energy utilization is performed directly on the exhaust duct without cooling circulating devices.

Figure 1:
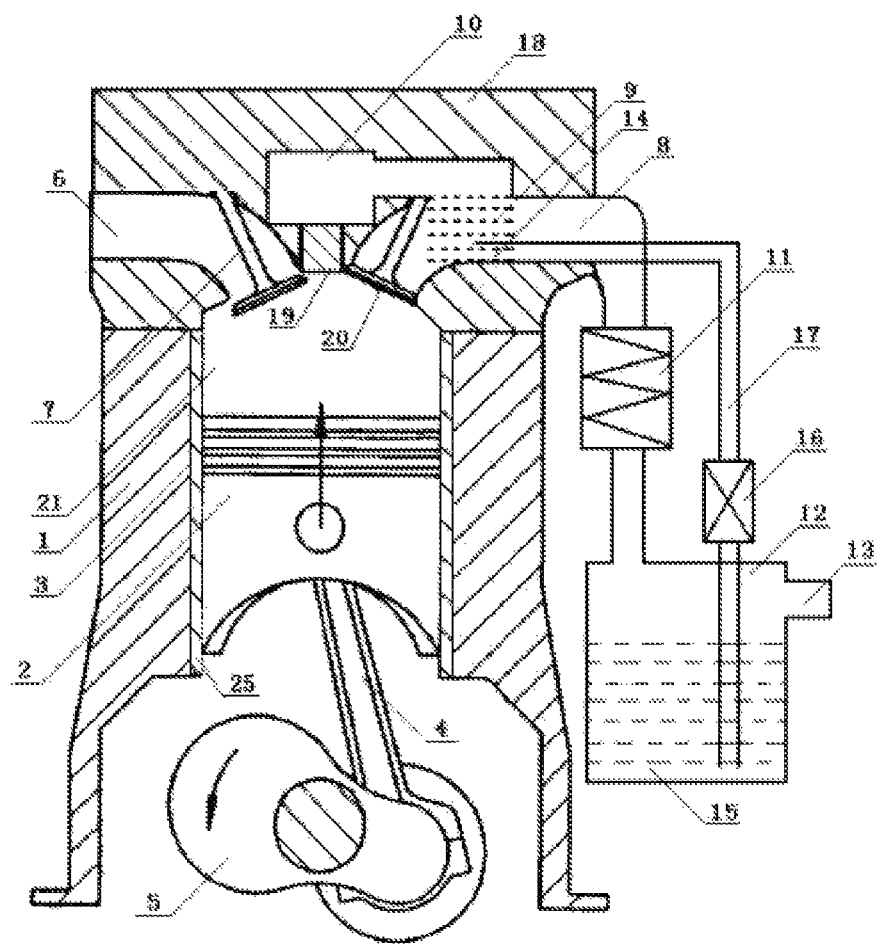
FIG. 1 is a structural schematic diagram of the present invention.
Figure 2:
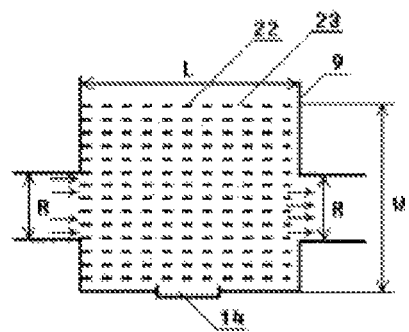
FIG. 2 is a sectional view of the gasifying plates of the present invention. The arrows indicate the direction of the exhaust gas flow.
Figure 3:
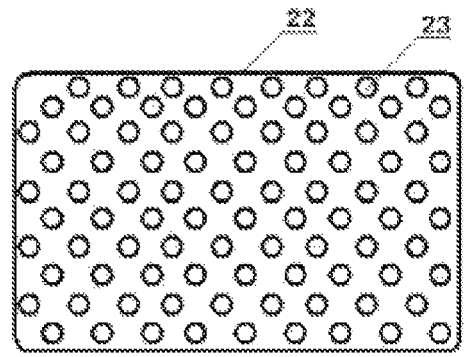
FIG. 3 is a schematic diagram a of the gasifying plates of the present invention.
Figure 4:
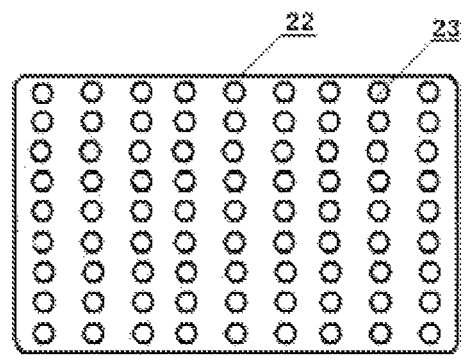
FIG. 4 is a schematic diagram b of the gasifying plates of the present invention.
Figure 5:
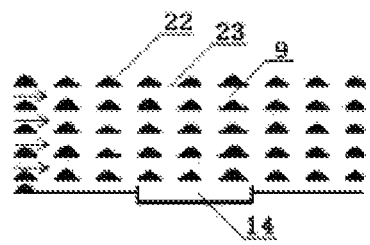
FIG. 5 is a schematic diagram c of the gasifying plates of the present invention.
Figure 6:
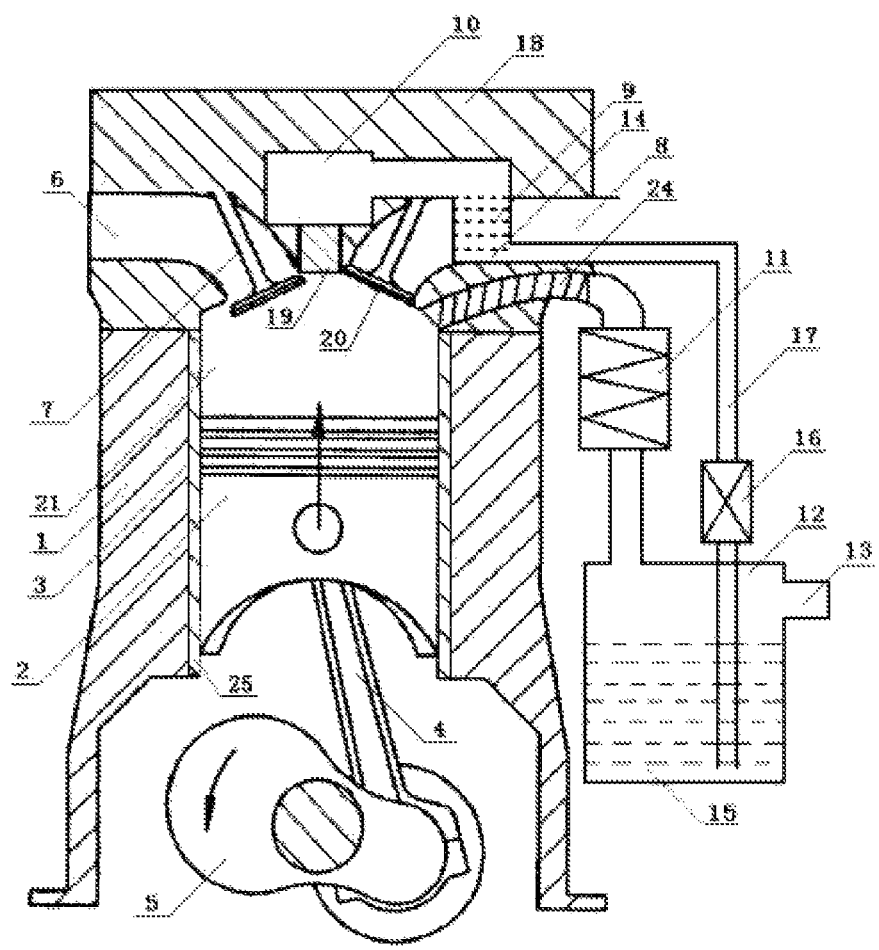
FIG. 6 is a structural schematic diagram of Embodiment 2 of the present invention.

In the figures, 1—cylinder block, 2—piston, 3—piston ring, 4—connecting rod, 5—crankshaft, 6—air intake duct, 7—air intake valve, 8—exhaust duct, 9—gasifier, 10—energy storage chamber, 11—cooler, 12—liquid storage tank, 13—exhaust port, 14—working medium inlet, 15—working medium that works, 16—pressure pump, 17—pipe, 18—cylinder head, 19—high-pressure valve, 20—exhaust valve, 21—combustion chamber, 22—gasifying plates, 23—gas holes, exhaust valve 24, 25—thermal insulation layer.

DETAILED DESCRIPTION OF EMBODIMENTS

Referring to the drawings, a more detailed description of the embodiments of the present invention is as below.

Embodiment 1

A high-pressure energy storage thermal energy power machine includes cylinder block 1, piston 2, piston ring 3, connecting rod 4, crankshaft 5, air intake duct 6, air intake valve 7, exhaust duct 8, cylinder head 18, exhaust valve 20, combustion chamber 21, and thermal insulation layer 25.

Combustion chamber 21 and piston 2 are positioned inside cylinder block 1. Piston 2 is provided with piston ring 3. Piston 2 is movably connected to connecting rod 4. Connecting rod 4 is connected to crankshaft 5. Cylinder head 18 is positioned on the upper part of cylinder block 1. Cylinder head 18 is provided with air intake duct 6 and exhaust duct 8. Air intake duct 6 is provided with air intake valve 7. Exhaust duct 8 is provided with exhaust valve 20. The high-pressure energy storage thermal energy power machine further includes gasifier 9, energy storage chamber 10, cooler 11, liquid storage tank 12, exhaust port 13, working medium inlet 14, working medium that works 15, pressure pump 16, pipe 17, and high-pressure valve 19. Gasifier 9 is formed with a plurality of gasifying plates 22 and a plurality of gas holes 23 which are arranged on each gasifying plate 22. Gasifier 9 is provided on exhaust duct 8 above cylinder head 18 of internal combustion engine. Gasifier 9 is provided with a plurality of gasifying plates 22 in the direction parallel to gas flow. Each gasifying plate 22 is provided with a plurality of gas holes 23. The bottom of gasifier 9 is provided with working medium inlet 14. The plurality of gasifying plates 22 are distributed with gaps. The plurality of gas holes 23 are distributed in an array on each gasifying plate 22. Energy storage chamber 10 is arranged on cylinder head 18. Gasifier 9 is connected to energy storage chamber 10. Energy storage chamber 10 is connected to high-pressure valve 19 which is positioned on cylinder head 18 and above the cylinder block 1. Exhaust duct 8 is connected to cooler 11. Cooler 11 is connected to liquid storage tank 12. Liquid storage tank 12 is connected to pressure pump 16 through pipe 17. Pressure pump 16 is connected to working medium inlet 14 through pipe 17. Liquid storage tank 12 is provided with exhaust port 13. Working medium 15 that works is inside liquid storage tank 12. Pipe 17 inside liquid storage tank 12 extends to the bottom. The cylinder of the internal combustion engine is wrapped with a thermal insulation layer 25 without cooling circulating devices. The volume ratio between energy storage chamber 10 and cylinder of internal combustion engine is 1:1.3. Preferably, the volume ratio between energy storage chamber 10 and cylinder of internal combustion engine is 1:1.5. Further preferably, the volume ratio between energy storage chamber 10 and cylinder of internal combustion engine is 1:2. More preferably, the volume ratio between energy storage chamber 10 and cylinder of internal combustion engine is 1:3. The pressure inside energy storage chamber 10 is same as the pressure which is generated by working. The ratio of the length of the gasifier to the width of the gasifier to the diameter of the exhaust duct is 3:3:1.

Embodiment 2

The high-pressure energy storage thermal energy power machine according to Embodiment 1, exhaust valve 24 is added to cylinder block 1. Exhaust valve 24 is connected to cooler 11. After high-pressure valve 19 works by injecting gas, exhaust valve 24 opens to exhaust. The thermal conductivity coefficient of the plurality of gasifying plates is greater than 300 W/m·K. High-pressure valve 19 and exhaust valve 24 are controlled by mechanical driving mechanism or automobile electronic control unit (ECU).

Embodiment 3

The high-pressure energy storage thermal energy power machine according to above Embodiment 1 or 2, the size of the gaps among the plurality of gasifying plates 22 depends on the number of layers and the thickness of the gasifying plate. The greater the size of the gap between the plurality of gasifying plates 22 is arranged, the thicker the thickness of gasifying plate 22 is arranged. The greater the diameter of gas holes 23 is arranged, the fewer the layers of the gasifying plates 22 are arranged. The smaller the size of the gap between the plurality of gasifying plates 22 is arranged, the thinner the thickness of gasifying plates 22 is arranged. The smaller the diameter of the plurality of gas holes 23 is arranged, the more layers of gasifying plates 22 are arranged. Gasifying plates 22 distributed with gaps have a staggered distribution with gas holes 23 which are positioned on gasifying plate 22. Preferably, TDC of the cylinder of the internal combustion engine is provided with three layers of gasifying plates 22 which are distributed with gaps. The size of the gap between the three layers of gasifying plates 22 is 1.5 mm, 1.8 mm, 2 mm, 2.5 mm, 2.8 mm, 3 mm, 3.6 mm, or 3.5 mm. The dimension of the gas hole is configured that the diameter of the gas hole on a lower layer of gasifying plate is half of the diameter of the gas hole on an adjacent upper layer of gasifying plate. The diameter of the gas hole on the second layer of gasifying plate is half of the diameter of the gas hole on the first layer of gasifying plate. The diameter of the gas hole on the third layer of gasifying plate is half of the diameter of the gas hole on the second layer of gasifying plate. More preferably, the diameter of the gas hole on the first layer of gasifying plate is 0.8 mm, 1.2 mm, 1.6 mm, 2 mm, 3.2 mm, 4 mm, 4.8 mm, 6 mm, 7.2 mm, 8 mm, 10 mm, 12 mm, or 14 mm. The diameter of the gas hole on the second layer of gasifying plate is 0.4 mm, 0.6 mm, 0.8 mm, 1 mm, 1.6 mm, 2 mm, 2.4 mm, 3 mm, 3.6 mm, 4 mm, 5 mm, 6 mm, or 7 mm. The diameter of the gas hole on the second layer of gasifying plate is 0.2 mm, 0.3 mm, 0.4 mm, 0.5 mm, 0.8 mm, 1 mm, 1.2 mm, 1.5 mm, 1.8 mm, 2 mm, 2.5 mm, 3 mm, or 3.5 mm. The thickness of the gasifying plate is 0.4 mm, 0.6 mm, 0.8 mm, 1 mm, 1.6 mm, 2 mm, 2.4 mm, 3 mm, 3.6 mm, 4 mm, 5 mm, or 6 mm. The cylinder of the internal combustion engine and the gasifying plates are made of thermally conductive metal material which has a thermal conductivity coefficient that is greater than 300 W/m·K. The alloy which is made from gold, silver, and copper is preferred.

Embodiment 4

The high-pressure energy storage thermal energy power machine according to Embodiment 1, 2, or 3 can be made into single-cylinder, double-cylinder, or multi-cylinder engine. Since the working medium that works is different, thermal energy utilizing efficiency is different. The structure of the present invention can be designed and used in gasoline engine or diesel engine or substitution gas engine according to demands.

The invention claimed is:
1. A high-pressure energy storage thermal energy power apparatus comprising:
    a gasifier, positioned on an exhaust duct of a cylinder head of an internal combustion engine,
    a plurality of gasifying plates, positioned on the gasifier in a direction parallel to an air flow,
    a plurality of gas holes, positioned on the plurality of gasifying plates,
    working medium inlet, positioned on a bottom of the gasifier,
    the plurality of gasifying plates being distributed with a plurality of gaps, the plurality of gas holes being distributed in an array on the plurality of the gasifying plates, an energy storage chamber being arranged on the cylinder head, the gasifier being connected to the energy storage chamber, the energy storage chamber being connected to a high-pressure valve, the high-pressure valve being positioned on the cylinder head and is placed above a cylinder block, a ratio between a volume of the energy storage chamber and a volume of a cylinder of the internal combustion engine being 1:1-3, a pressure inside the energy storage chamber being a pressure generated by working of the working medium, a length of the gasifier: a width of the gasifier: a diameter of the exhaust duct=3:3:1, an external layer of the internal combustion engine being wrapped with a thermal insulation layer.

2. The high-pressure energy storage thermal energy power apparatus of claim 1, wherein the volume of the energy storage chamber is 1-3 times the volume of the cylinder of the internal combustion engine, the pressure inside the energy storage chamber being the pressure generated by working of the working medium.

3. The high-pressure energy storage thermal energy power apparatus of claim 1 wherein the gasifier is provided with at least one gasifying plate.

4. The high-pressure energy storage thermal energy power apparatus of claim 1 wherein a size of each of the plurality of gaps between the plurality of gasifying plates which are distributed with the plurality of gaps is 1.2-6 mm.

5. The high-pressure energy storage thermal energy power apparatus of claim 1 wherein the plurality of gas holes in an upper layer of gasifying plate and a lower layer of gasifying plate are in a same axis, the gasifier being provided with three layers of gasifying plate that distributed with the plurality of gaps, the size of the gap of the three layers of gasifying plates that are distributed with the plurality of gaps being 1.5-3.5 mm.

6. The high-pressure energy storage thermal energy power apparatus of claim 1 wherein dimensions of the plurality of gas holes are that a diameter of the gas hole on an upper layer of gasifying plate is one time larger than a diameter of the plurality of gas holes on an adjacent lower layer of gasifying plate, wherein a diameter of the plurality of gas holes on a first layer of gasifying plate is one time larger than a diameter of the plurality of gas holes on a second layer of gasifying plate, and a diameter of the plurality of gas holes on the second layer of gasifying plate is one time larger than a diameter of the plurality of gas holes on a third layer gasifying plate.

7. The high-pressure energy storage thermal energy power apparatus of claim 1 wherein, a diameter of each of the plurality of gas holes on a first layer of gasifying plate is 0.8-14 mm, a diameter of each of the plurality of gas holes on a second layer of gasifying plate is 0.4-7 mm, a diameter of each of the plurality of gas holes on a third layer of gasifying plate is 0.2-3.5 mm, a thickness of each of the plurality of gasifying plates is 0.2-6 mm, the cylinder of the internal combustion engine and the plurality of gasifying plates are both made of metal thermally conductive material, the cylinder of the internal combustion engine is wrapped with the thermal insulation layer without a cooling circulating device.

8. A working method of a high-pressure energy storage thermal energy power apparatus, comprising configuring the high-pressure energy storage thermal energy power apparatus including a gasifier, positioned on an exhaust duct of a cylinder head of an internal combustion engine, a plurality of gasifying plates, positioned on the gasifier in a direction parallel to an air flow, a plurality of gas holes, positioned on the plurality of gasifying plates, working medium inlet, positioned on a bottom of the gasifier, the plurality of gasifying plates being distributed with a plurality of gaps, the plurality of gas holes being distributed in an array on the plurality of the gasifying plates, an energy storage chamber being arranged on the cylinder head, the gasifier being connected to the energy storage chamber, the energy storage chamber being connected to a high-pressure valve, the high-pressure valve being positioned on the cylinder head and is placed above a cylinder block, a ratio between a volume of the energy storage chamber and a volume of a cylinder of the internal combustion engine being 1:1-3, a pressure inside the energy storage chamber being a pressure generated by working of the working medium, a length of the gasifier: a width of the gasifier: a diameter of the exhaust duct=3:3:1, an external layer of the internal combustion engine being wrapped with a thermal insulation layer;

adding a working stoke performed by a high-pressure injected gaseous working medium and an exhaust stroke, after steps of working or exhausting of an existing engine, wherein the high-pressure injected gaseous working medium is formed by the gasifier and the energy storage chamber, passing gas which has a high temperature and a high-pressure through the gasifier arranged in the exhaust duct, after the existing engine discharges exhaust, injecting, by a pressure pump, the working medium that works into the working medium inlet which is positioned at a bottom of the gasifier so that the working medium is instantly gasified, and high-pressure gas is generated and flows into the energy storage chamber, opening the high-pressure valve when the piston arrives the TDC, wherein high-pressure gas inside the energy storage chamber injects high-pressure gaseous working medium and pushes the piston to work again, after the piston works again, closing the high-pressure valve, discharging the working medium that works through the exhaust duct, cooling the discharged working medium that works by a cooler, wherein after being cooled, the discharged working medium flows into a liquid storage tank, discharging residual exhaust gas by the exhaust port which is positioned on the liquid storage tank.

9. The working method of the high-pressure energy storage thermal energy power apparatus of claim 8, wherein each working cycle of a six-stroke engine includes an intake stroke, a compression stroke, a working stroke, an exhaust stroke, an air injection working stroke, and an exhaust stroke, to accomplish a working cycle of the six-stroke engine, a piston needs to go back and forth for six strokes, i.e., a crankshaft turning three times, the internal combustion engine of the working method can be a gasoline engine, a diesel engine, or a substitute fuel engine, the internal combustion engine can be a dual-stroke engine, a four-stroke engine, a six-stroke engine, or engines with other strokes added with an air injection working stroke.

10. The working method of the high-pressure energy storage thermal energy power apparatus of claim 8, wherein the volume of the energy storage chamber is 1-3 times the volume of the cylinder of the internal combustion engine, the pressure inside the energy storage chamber being the pressure generated by working of the working medium.

11. The working method of the high-pressure energy storage thermal energy power apparatus of claim 8, wherein the gasifier is provided with at least one gasifying plate.

12. The working method of the high-pressure energy storage thermal energy power apparatus of claim 8, wherein a size of each of the plurality of gaps between the plurality of gasifying plates which are distributed with the plurality of gaps is 1.2-6 mm.

13. The working method of the high-pressure energy storage thermal energy power apparatus of claim 8, wherein the plurality of gas holes in an upper layer of gasifying plate and a lower layer of gasifying plate are in a same axis, the gasifier being provided with three layers of gasifying plate that distributed with the plurality of gaps, the size of the gap of the three layers of gasifying plates that are distributed with the plurality of gaps being 1.5-3.5 mm.

14. The working method of the high-pressure energy storage thermal energy power apparatus of claim 8, wherein dimensions of the plurality of gas holes are that a diameter of the gas hole on an upper layer of gasifying plate is one time larger than a diameter of the plurality of gas holes on an adjacent lower layer of gasifying plate, wherein a diameter of the plurality of gas holes on a first layer of gasifying plate is one time larger than a diameter of the plurality of gas holes on a second layer of gasifying plate, and a diameter of the plurality of gas holes on the second layer of gasifying plate is one time larger than a diameter of the plurality of gas holes on a third layer gasifying plate.

15. The working method of the high-pressure energy storage thermal energy power apparatus of claim 8, wherein, a diameter of each of the plurality of gas holes on a first layer of gasifying plate is 0.8-14 mm, a diameter of each of the plurality of gas holes on a second layer of gasifying plate is 0.4-7 mm, a diameter of each of the plurality of gas holes on a third layer of gasifying plate is 0.2-3.5 mm, a thickness of each of the plurality of gasifying plates is 0.2-6 mm, the cylinder of the internal combustion engine and the plurality of gasifying plates are both made of metal thermally conductive material, the cylinder of the internal combustion engine is wrapped with the thermal insulation layer without a cooling circulating device.

* * * * *